United States Patent
Zhang et al.

(10) Patent No.: US 8,520,677 B2
(45) Date of Patent: Aug. 27, 2013

(54) METHOD OF DATA RATE ADAPTATION FOR MULTICAST COMMUNICATION

(75) Inventors: Yan Feng Zhang, Beijing (CN); Xiao-Jin Ma, Beijing (CN); Zhi Gang Zhang, Beijing (CN); Lin Xiang Cheng, Beijing (CN); Xian Lei Wang, Beijing (CN)

(73) Assignee: Thomson Licensing, Boulogne-Billancourt (FR)

( * ) Notice: Subject to any disclaimer, the term of this patent is extended or adjusted under 35 U.S.C. 154(b) by 185 days.

(21) Appl. No.: 12/998,565

(22) PCT Filed: Nov. 2, 2009

(86) PCT No.: PCT/IB2009/007342
§ 371 (c)(1),
(2), (4) Date: May 3, 2011

(87) PCT Pub. No.: WO2010/052553
PCT Pub. Date: May 14, 2010

(65) Prior Publication Data
US 2011/0211468 A1    Sep. 1, 2011

(30) Foreign Application Priority Data

Nov. 7, 2008   (EP) .................................... 08305789

(51) Int. Cl.
H04L 12/28 (2006.01)
H04H 20/71 (2008.01)

(52) U.S. Cl.
USPC .......................................... 370/390; 370/312

(58) Field of Classification Search
None
See application file for complete search history.

(56) References Cited

U.S. PATENT DOCUMENTS

| | | | |
|---|---|---|---|
| 6,577,599 B1* | 6/2003 | Gupta et al. | 370/236 |
| 2004/0121788 A1* | 6/2004 | Moon et al. | 455/502 |
| 2004/0165575 A1 | 8/2004 | Yang et al. | |
| 2004/0219937 A1* | 11/2004 | Sugar et al. | 455/500 |
| 2005/0138671 A1* | 6/2005 | Love et al. | 725/123 |
| 2006/0209763 A1 | 9/2006 | Emott et al. | |
| 2007/0091889 A1* | 4/2007 | Xiao et al. | 370/390 |
| 2007/0133478 A1 | 6/2007 | Armbruster et al. | |
| 2008/0014951 A1* | 1/2008 | Laroia et al. | 455/450 |
| 2008/0049749 A1* | 2/2008 | Xiao et al. | 370/390 |
| 2008/0076466 A1* | 3/2008 | Larsson | 455/522 |

FOREIGN PATENT DOCUMENTS

| | | |
|---|---|---|
| EP | 0969622 | 1/2000 |
| EP | 1921788 | 5/2008 |

OTHER PUBLICATIONS

Search Rept: Mar. 19, 2010.

* cited by examiner

Primary Examiner — Derrick Ferris
Assistant Examiner — Joe Combs
(74) Attorney, Agent, or Firm — Robert D. Shedd; Jerome G. Schaefer

(57) ABSTRACT

A method to implement an adaptive multicast data rate transmission selection includes determining the lowest signal strength station in a multicast group, using signal strength as an indicator to increase data rate, and determining if the increase in data rate is viable for multicast transmission by determining frame or packet loss using the increased data rate.

13 Claims, 10 Drawing Sheets

METHOD OF DATA RATE ADAPTATION FOR MULTICAST COMMUNICATION

This application claims the benefit, under 35 U.S.C. §365 of International Application PCT/IB2009/007342, filed Nov. 2, 2009, which was published in accordance with PCT Article 21(2) on May 14, 2010 in English and which claims the benefit of European patent application No. 08305789.3, filed Nov. 7, 2008.

CROSS-REFERENCE TO RELATED APPLICATIONS

This application claims priority to application EP 08305789.3 entitled "A Method of Data Rate Adaptation For Multicast Communication" filed 7 Nov. 2008, which is incorporated herein in its entirety.

FIELD OF THE INVENTION

The present invention relates to data transmission technology, and particularly to a method for adjusting data transmission rates in a cable multicasting system.

BACKGROUND

There are existing specifications which define the communications and operational support interface requirements for a data-over-cable system. One of these specifications is data over cable service interface specification (DOCSIS), an international standard which permits the addition of high-speed data transfer to an existing cable television (CATV) system and is employed by many cable television operators to provide Internet access over their existing hybrid fiber coaxial (HFC) infrastructure.

Cable modems based on solutions such as DOCSIS are expensive and are not suitable to provide a quality of service (QoS) that is sensitive to real time audio communication and video streaming services in cable networks. It is desirable to develop a new system to transmit data through a CATV cable access network which can guarantee good quality of service (QoS) and leverages off of existing standard protocols at a reasonable cost. A user-terminal device or modem which operates on an existing CATV system and provides internet-style data services to client devices, such as devices on a local area network, is also desirable in a cable data system. In such a system, multicasting to user-terminals would be an efficient method to distribute content to a multiplicity of user terminals that are to receive the same data. In multicasting, transmission data rates are usually fixed by the slowest receive rate of the members in a multicast group. But, the slowest rate user-terminal may change over time. Assigning a slowest, fixed data rate user-terminal approach to data rate transmission in a multicasting scheme may not accommodate changes in the user-terminals within the multicast group. Another factor is the access point. If the access point increases transmit power to some stations, the increased power may allow a higher data rate to the selected stations. A more efficient and adaptable data rate determination mechanism would be beneficial to bandwidth preservation in the cable system.

SUMMARY

In accordance with an aspect of the invention, a method conducted by an access point to adaptively adjust data rate in a multicast transmission includes transmitting multicast message frames from the access point to a multicast group of stations at a first data rate. The access point then receives acknowledgments of successful frame reception from the stations using the first data rate. The first data rate is then increased to a second data rate for a temporary period of time. During the temporary period of time, multicast message frames are transmitted to the stations and multicast frame loss is evaluated while using the second data rate for multicast transmissions. The evaluation includes comparing the frame loss to a threshold. If the frame loss reaches the threshold, the frame loss is too high and the access point reduces the second data rate back down to the first data rate. However, if the frame loss is less than the threshold, then the second data rate is used as the new data rate for multicast messages/data/frames.

As an aspect of the invention, the adaptive data rate adjustment may be used in a cable system that utilizes IEEE 802.11 frames in a time division multiplexed protocol. A change of rate from a first data rate to a higher second data rate is based on feedback from stations receiving a multicast message. An increase in data rate can result from an increase in the received signal strength of a reference station having the lowest signal strength in a multicast group. Another method to increase data rate is to receive a number of consecutive acknowledgement signals from a reference station. The increased data rate is then tested for a time period to determine if the higher data rate should be adopted as the new multicast data rate.

In another aspect of the invention, a station actively participates in multicast data rate adjustment by first receiving a beacon frame having a minimum signal strength value of a reference station within a multicast group. The station measures a new receive signal strength value and determines if the new received signal strength value is less than the minimum signal strength value from the beacon frame. If the new received signal strength value is less than the minimum signal strength value, then the station transmits the new received signal strength value to the access point. The station determines if it is the reference station having the minimum signal strength value acquired from the beacon frame information. Then, if the first station is the reference station and the new received signal strength value is greater than the minimum signal strength value, the station transmits the new received signal strength value to the access point. The access point can then perform its complementary portion of the invention.

Additional features and advantages of the invention are made apparent from the following detailed description of illustrative embodiments which proceeds with reference to the accompanying figures.

DETAILED DISCUSSION OF THE EMBODIMENTS

General Description

As used herein, "/" denotes alternative names for the same or similar components or structures. That is, a "/" can be taken as meaning "or" as used herein. Unicast transmissions are between a single sender/transmitter and a single receiver. Broadcast transmissions are between a single sender/transmitter and all receivers within receiving range of the transmitter. Multicast transmissions are between a single sender/transmitter and a subset of the receivers within receiving range of the transmitter where the subset of receivers within receiving range of the transmitter may be the entire set. That is, multicast may include broadcast and is therefore a broader term than broadcast as used herein. Data/content is transmitted in packets or frames.

In order to provide data service over existing coaxial cable TV system (CATV), at least one implementation deploys a time division function (TDF) protocol compliant access point (AP) and stations (STAs) in a cable access network. The AP and STAs are connected via couplers in a hierarchical tree structure. In this way, a user at home can access the remote internet protocol (IP) core network via a cable access network. Access to the IP core by the user opens up services such as, but not limited to, Internet access, digital telephone access (e.g. voice over internet protocol), and cable television programming. An example network architecture 100 is illustrated in FIG. 1.

Figure 1:
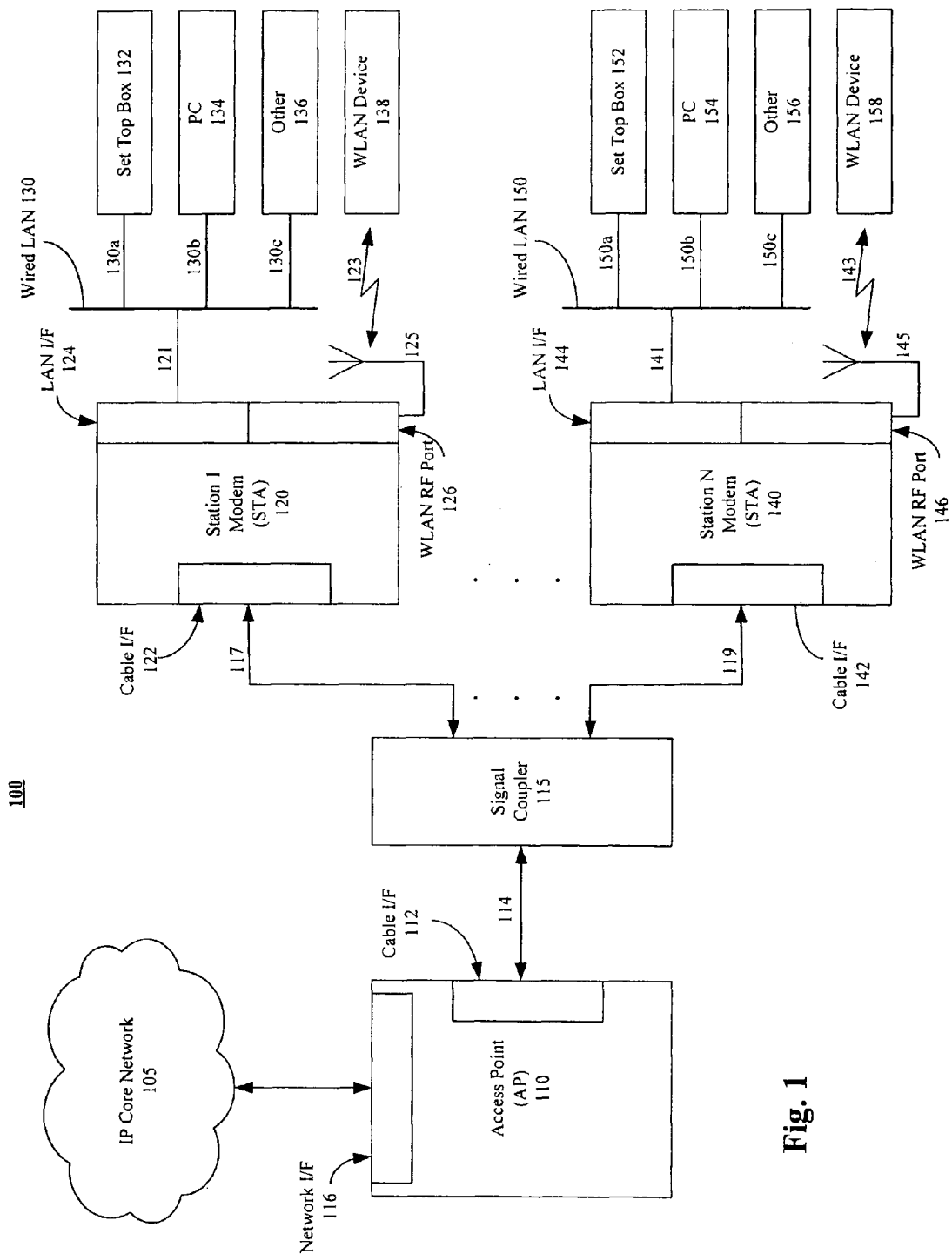
FIG. 1 illustrates a simplified exemplary TDF access network architecture.

FIG. 1 depicts one embodiment of a network that accesses an IP core network 105. The IP core network may be any digital network that uses an Internet Protocol or equivalent digital data transfer protocol. In the example embodiment of FIG. 1, a time division function (TDF) protocol compliant access point (AP) 110 has a network interface 116, such as wired LAN or optical interface, in connection with the IP core network 105, and a cable interface 112 in connection with a cable access network. Many such access points may be connected to the IP core network. The cable access interface 112 of AP 110 may access any form of cable such as optical fiber, coaxial, or other physically connected communications medium. As a result, the cable network may include any form of cable such as optical fiber, coaxial, or other physically connected communications medium. The cable network can include a signal coupler 115, if required, and distribution mediums such as interconnecting cables 117 and 119. Although only two such distribution cables are shown in FIG. 1, it is understood that a multiplicity of such distribution connections are possible.

In the example of FIG. 1, the distribution cables 117 and 119 connect to TDF protocol compliant stations (STAs) 120, 140 via cable interfaces 122 and 142 respectively. STA cable interfaces 122 and 142 may also access any form cable such as optical fiber, coaxial, or other physically connected communications medium. STAs 120 and 140 are TDF compliant and act as user-terminals which can connect with the cable access network with a multiplicity of interfaces for a user/client. Those interfaces include, but are not limited to user/client devices operational on a conventional physical local area network (LAN) and a wireless local area network (WLAN). One example LAN is an Ethernet compliant network. One example wireless network is an IEEE 802.11 compatible wireless network.

FIG. 1 depicts a station 1 modem 120 and station N modem 140 as having similar interfaces. However, this representation is merely exemplary because stations of different capabilities may be attached to the cable network provided the stations are communicatively compliant with the AP 110. For example, a station modem may have all of the user interfaces shown in FIG. 1 or only a selected subset. In FIG. 1, station 1 is configured to support a LAN interface 124 driving LAN connection 121 to a physical wired LAN 130 having stubs 130a, 130b, and 130c. The stubs support LAN compliant devices such as a set top box 132 for television and other services, a personal computer (PC) 134 for network services, such as Internet service, and other LAN compliant devices 136 which may include devices that support any type of digital service that provides multimedia services such as video, audio, telephony, and data. Such LAN compliant devices 136 include but are not limited to a fax, a printer, a digital telephone, a server, etc. FIG. 1 depicts station 120 as also providing wireless services via WLAN radio frequency (RF) port 126 to drive antenna 125. The resulting wireless transmissions 123 can be used by a WLAN compliant device 138 to provide services to a user/client that include any of multimedia voice, audio, telephony, and data. Although only one wireless device 138 is shown, a multiplicity of such wireless devices may be used. Likewise, Station N also includes LAN interface 144 to drive LAN connection 141 for physical LAN 150 having stubs 150a, 150b, and 150c. Such stubs support communications with such LAN compatible devices such as set top box 152, PC 154, and other devices 156. WLAN RF port 146 supports antenna 145 providing link 143 for communication with WLAN device 158. It is understood by those of skill in the art that appropriate interface drivers exist for each of the network interface 116, cable interfaces 112, 122, 142, wired LAN interfaces 124, 144, and WLAN RF interfaces 126, 146 in FIG. 1.

In one embodiment of the network 100, both TDF compliant APs and STAs implement a protocol stack separately in a logically linked control sublayer, MAC sublayer and physical layer, according to IEEE 802.11 series specifications. However, in the MAC sublayer, the TDF APs and STAs replace the IEEE 802.11 frame transmission entity with a TDF frame/message/signal transmission entity. So, the MAC sublayer for TDF APs and STAs includes an IEEE 802.11 frame encapsulation/decapsulation entity and TDF frame transmission entity, while the MAC sublayer for IEEE 802.11 compliant APs and STAs includes IEEE 802.11 compliant frame encapsulation/decapsulation entity and an IEEE 802.11 frame transmission entity. For an integrated AP and STA, the TDF frame transmission entity and IEEE 802.11 frame transmission entity may co-exist at the same time, to provide both IEEE 802.11 and TDF functionality. The switch between the two modes can be realized by either a manual or a dynamic configuration.

An example system, such as in FIG. 1, that includes one or more APs, a cable network, and one or more STAs may also be termed an asymmetric data over coaxial cable (ADoC) system. One or more protocol compliant ADoC access points (APs) and one or more stations (STAs) are deployed in the ADoCs cable access network. Thus, as used herein, the terms "ADoC system" and "TDF system" may be considered interchangeable because the ADoC system is a particular implementation of a TDF system. In the ADoC system, as in FIG. 1, the AP and STAs are connected via couplers in a hierarchy tree structure of a cable network that includes elements such as cable, splitters, amplifiers, relays, repeaters, switches, converters, and the like that are typical of cable network configurations.

TDF Protocol Introduction

The AP 110 and the STAs 120 and 140 of FIG. 1 utilize a TDF protocol to communicate on the cable medium. In one embodiment of the TDF protocol, IEEE 802.11 frames are transmitted via the cable media instead of over the air. The purpose of utilizing the IEEE 802.11 mechanism is to make use of the mature hardware and software implementation of IEEE 802.11 protocol stacks. Thus, TDF, using IEEE 802.11 frames, is used in the cable network of FIG. 1 as the communication standard between an AP and its associated STAs.

One feature of TDF is its unique medium access control method for transmitting IEEE 802.11 data frames. In one-embodiment, TDF does not utilize the conventional IEEE 802.11 DCF (distributed coordination function) or PCF (point coordination function) mechanism to exchange MAC frames, which include MSDU (MAC service data unit) and MMPDU (MAC management protocol data unit). Instead, TDF uses a time division access method to transmit MAC frames/messages/signals. So the TDF is an access method which defines a detailed implementation of a frame transmission entity located in MAC sublayer.

Figure 2:
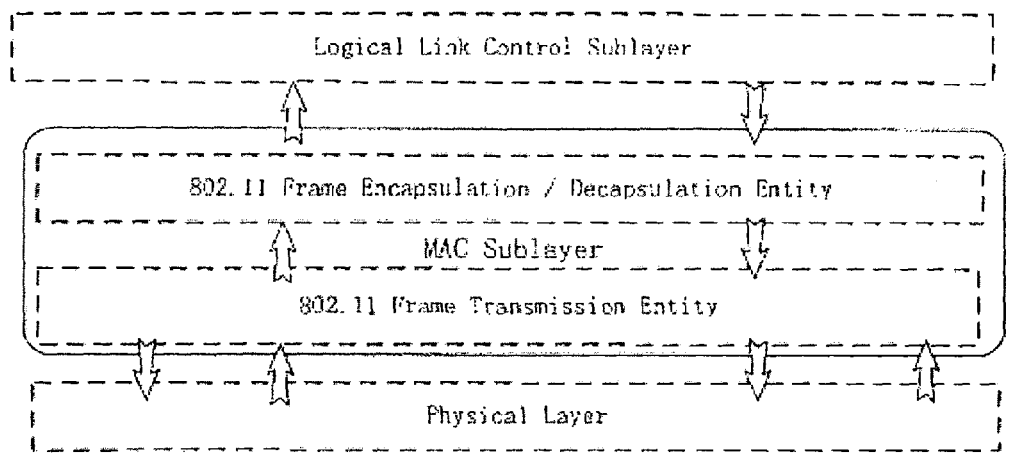
FIG. 2 illustrates the 802.11 MAC sublayer in OSI reference model.
Figure 3:
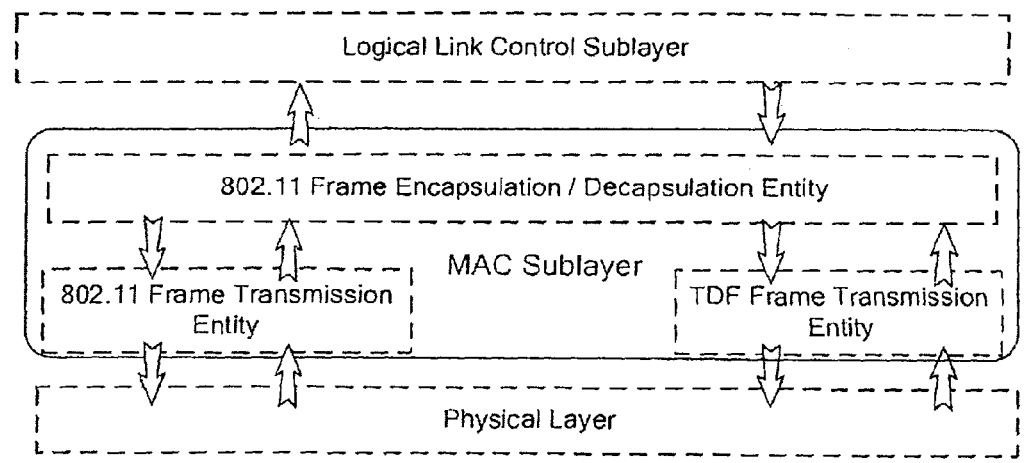
FIG. 3 illustrates an implementation of a TDF transmission entity in OSI reference model.

FIG. 2 illustrates the standard IEEE 802.11 MAC sublayer protocol in the open system interconnection (OSI) reference model. In comparison, FIG. 3 illustrates details of the frame transmission entities for the TDF protocol in the OSI reference model.

Figure 4:
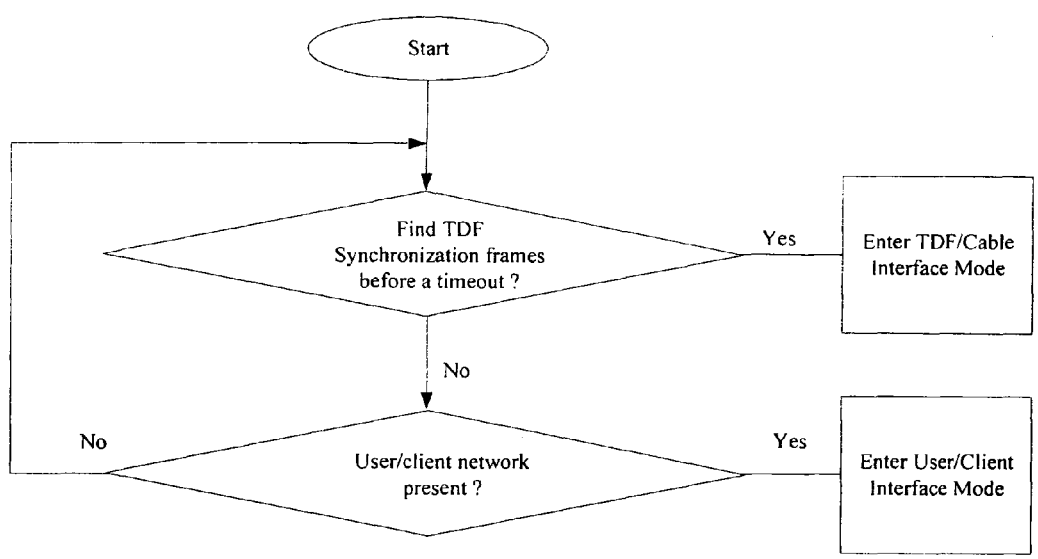
FIG. 4 illustrates an example of a mode entrance procedure.

In one embodiment, the stations, such as STA 120 and STA 140, operate in two communication modes. One mode is the standard IEEE 802.11 operation mode, which is also known as a user/client interface mode, which obeys the frame structure and transmission mechanism defined in IEEE 802.11 series standard. The other mode is the TDF operation mode, which is also known as the cable interface mode. In one embodiment, the determination of which operation mode to enter when a STA is started is indicated in FIG. 4. Once a STA receives a synchronization frame/message/signal from an AP, the STA enters into TDF mode. If there is no synchronization frame received within a preset timeout, then the STA remains or shifts into the user/client interface mode. More operational mode switching criteria are provided herein.

TDF Protocol Functional Descriptions:

Access Method

The physical layer in a TDF station may have multiple data transfer rate capabilities that allow implementations to perform dynamic rate switching with the objective of improving performance and device maintenance. In one embodiment, a station may support a multiplicity of data rates. The data rate may be configured statically before a TDF station enters the TDF communication procedure, and remain the same during the whole communication process. On the other hand, the TDF station may also support dynamic data rate switching during the service. The criteria for the data rate switching may be based on the channel signal quality and other factors. The present invention addresses dynamic data rate switching during a multicast transmission.

The fundamental access method of the TDF protocol is time division multiple access (TDMA), which allows multiple users to share the same channel by dividing it into multiple different timeslots. The STAs receive downloads and transmit uploads in rapid succession, one after the other, each using their own timeslot within a TDF superframe assigned by the AP. Downlink traffic is defined as the transport of data from an AP to a STA. Examples of downlink traffic include requested digital data/content, such as audio or video requested by a user/client device. Downlink data can be either unicast, broadcast, or multicast. Uplink traffic is defined as the transport of data from a STA to the AP. Examples of uplink traffic include a user request for digital data/content or commands to the AP to perform some function. Uplink data may be either unicast or multicast.

Figure 5:
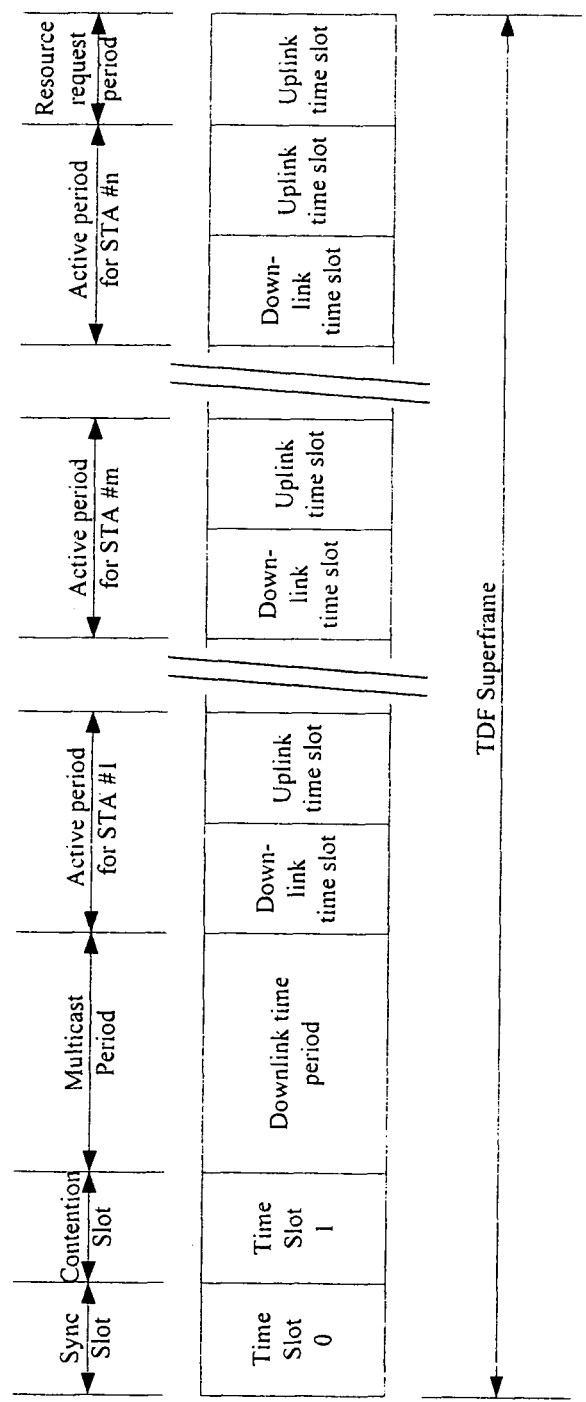
FIG. 5 illustrates an example of a TDF superframe structure.

FIG. 5 illustrates an example of a TDF superframe structure and the timeslot allocations for a typical TDF superframe when there are "n" STAs. As shown in FIG. 5, there is a fixed number of timeslots per TDF superframe, which includes one synchronization timeslot used to send clock synchronization information from an AP to one or more STAs and one contention timeslot used to send registration request for uplink timeslot allocation. Uplink timeslots allocated to a STA are used by the indicated registered STA to send data and some management frames to an AP. Downlink timeslots are used by the AP to transmit data and registration response management frames to the STAs. Except for the synchronization timeslot, all other timeslots may have the same duration. The multicast period of FIG. 5 uses one or more pre-determined number of timeslots to accommodate the length of the multicast data. The value of a typical timeslot duration is defined to allow the transmission of at least one largest IEEE 802.11 PLCP (physical layer convergence protocol) protocol data unit (PPDU) in one normal timeslot for the highest data rate mode. The duration of a synchronization timeslot can be shorter than that of the typical timeslots, because the clock synchronization frame, which is transmitted from an AP to a STA in this timeslot, may be shorter than an IEEE 802.11 data frame. The TDF superframe of FIG. 5 is an example of a format where the slot fields are ordered as sync slot, contention slot, multicast period, downlink and uplink timeslot pairs. Other orderings of the slot fields are also possible provided that the sync slot occurs first in the superframe. For example, following orderings are also possible; (i) sync slot, downlink slots, uplink slots, contention slot, (ii) sync slot, uplink slots, downlink slots, contention slot, and (iii) sync slot, contention slot, downlink slots, uplink slots. Other organizations are also possible.

In one implementation, a typical time slot duration is about 300 us, which is enough for the STA to transmit at least one largest IEEE 802.11 PPDU in one common timeslot for 54 Mbps mode. There are a total of 62 timeslots per TDF superframe. In these timeslots, there are uplink and downlink timeslot pairs. When there are 20 STAs, each STA can be guaranteed that it has access to 680 kbps of uplink data rate. Downlink data rate depends on the occurrence of multicast data and the requirements placed on the AP for downlink data transmission. Finally, the duration of a superframe, which in one embodiment is the total duration of 61 typical timeslots and one synchronization timeslot, is about 18.6 ms and it can be defined to a different value for different usages. For example, if there is only one STA, it can be guaranteed that the STA has 4 timeslots to achieve about 18 Mbps of uplink data rate and own 18 Mbps (4 continuous timeslots) of downlink data rate. In this way, the value of a superframe duration is about 4 ms.

Frame/Message/Signal Formats

In the IEEE 802.11 specification, three major frame types exist; data frames/messages/signals, control frames/messages/signals, and management frames/message/signals. Data frames are used to exchange data from an access point to a station and vice-versa. Several different kinds of data frames exist, depending on the network. Control frames are used in conjunction with data frames to perform area clearing operations, channel acquisition and carrier-sensing maintenance functions, and positive acknowledgement of received data. Control and data frames work in conjunction to deliver data reliably between access points and stations. More specifically, one important feature in exchanging frames is that there is an acknowledgement mechanism, and accordingly an acknowledgement (ACK) frame for every downlink unicast frame. This exists in order to reduce the possibility of data loss caused by an unreliable wireless channel. Management frames perform supervisory functions. They are used to join and leave wireless networks and move associations from access point to access point. As used herein, the term "frames" may also be referred to as messages or signals in all cases. Equivalently, the term "frames/messages/signals" may also be used to denote equivalents.

In one embodiment of the TDF system, STAs passively wait for a synchronization frame/message/signal from the AP to identify a controlling AP. The synchronization frame is a frame of data located within the sync slot (time slot 0) of FIG. 5. Since STAs wait for the AP to send a synchronization frame, there is no need for the typical probe request and probe response frames found in wireless implementations of the IEEE 802.11 standard. But, acknowledgement (ACK) frames/messages/signals are used to ensure the reliability of data frame delivery.

In the TDF protocol, only some of the useful IEEE 802.11 MSDU and MMPDU types for data are used in a cable medium. For example, the data subtype in data frame types is used to encapsulate the upper layer data and transmit it between access points and stations. New management frames can be used to accommodate a clock synchronization requirement in TDF system. For example, if additional information is needed to be sent to multiple STAs from an AP, it may be included in a synchronization frame.

In one embodiment of the TDF system, a TDF superframe, as shown in FIG. 5, periodically transmits an IEEE 802.11 beacon frame as part of the sync slot (timeslot 0) to synchronize the STA to the associated AP. A typical beacon frame is a management frame that contains header and frame body information. As with other frames, the header includes source and destination MAC addresses as well as other information regarding the communications process. The destination address may be set to all ones, which is the broadcast medium access control (MAC) address. This instructs all STAs on the applicable channel to receive and process the beacon frame.

Access Point (AP) Searching and Clock Synchronization

The TDF protocol provides a distribution of timing information to all the STA nodes. A STA listens to a synchronization frame/message/signal in the sync slot of the FIG. 5 superframe to decide if there is an active AP available. Once the STA enters TDF communications, the STA uses the synchronization frame to adjust its local timer, based on which the STA decides if it is its turn to send uplink frames. At any given time, the AP is the master and the STA is a slave in the synchronization procedure. If the STA has not received a synchronization frame from the associated AP for a predefined threshold period, the STA reacts as if the associated AP has stopped servicing the STA. In this instance, the STA stops communicating with the silent AP and starts to look for an active AP by listening for the synchronization frame again.

In the TDF system, all STAs associated with the same AP synchronize to a common clock. The AP periodically transmits special frames called synchronization frames that contain the AP clock information to synchronize the STAs in its local network. In one embodiment, synchronization frames are generated for transmission by the AP once every TDF superframe time and sent in the sync timeslot of the TDF superframe.

Every STA maintains a local timing synchronization function (TSF) timer to ensure it is synchronized with the associated AP. After receiving a synchronization frame, a STA always accepts the timing information in the frame. If the STA TSF timer is different from the timestamp in the received synchronization frame from the AP, then the receiving STA sets its local timer according to the received timestamp value. Further, the STA may add a small offset to the received timing value to account for local processing by the transceiver.

STA Registration with an AP

Once a STA has acquired timer synchronization information from the synchronization frame, the STA learns when timeslot 0 occurs. If a STA is not associated with any active AP, the STA tries to register with an AP which sent a synchronization frame. The STA associates with an AP by sending Registration request frames to the AP during the contention timeslot, which is the second timeslot in a TDF superframe of FIG. 5. In one embodiment, the duration of the contention timeslot and the registration request frame/message/signal structure are designed to allow for sending multiple Registration request frames in one contention timeslot. Based on the design, the contention timeslot is divided into equal length sub-timeslots.

As soon as a STA detects an active, targeted AP, the STA chooses one sub-timeslot in the contention timeslot to send registration request frame to the AP. The purpose of this action is to reduce the chance of collision when there are many STAs starting at the same time and trying to register with the same AP simultaneously. A registration request may occur according to the following method:

A. Upon allocation of an uplink timeslot, a STA stores the allocated uplink timeslot number. The allocated uplink timeslot indicates the timeslot's location in the whole pool of uplink timeslots.

B. The AP allocates the same uplink timeslot to the same STA every time the STA requests an uplink timeslot.

C. When it is time to select a timeslot in which to send a registration request frame, if there is a stored allocated timeslot value, the STA sets the sub-timeslot number to the allocated value. If there is no such value, the STA randomly chooses one sub-timeslot in the available timeslots. The STA then sends the registration request frame to the AP in the randomly chosen sub-timeslot.

The STA lists all data rates it supports at that time and also sends some information such as the received signal carrier/noise ratio in the registration request frame. The STA may send several successive registration request frames with different supported data rates. After sending out the frame, the STA listens for the registration response frames/messages/signals from the AP.

After receiving a registration request frame from a STA, based on the following method, the AP sends different kinds of registration response frames back to the STA in the downlink timeslots.

A. If the already allocated uplink timeslots exceeds the number of timeslots available in a superframe, the AP puts an uplink timeslot unavailable indicator in the frame body.

B. If the AP does not support any data rates listed in the supported data rates set in the registration request management frame, the AP puts an unsupported data rates indicator in the frame body.

C. If there are uplink timeslots available to allocate and common data rates that both the AP and STA support, the AP allocates one uplink timeslot and chooses a suitable common data rate according to information such as carrier/noise ratio in the STA's registration request frame, and then sends a registration response frame to the STA. The frame/message/signal body contains the allocated uplink timeslot and the chosen data rate information. After a successful registration process, the TDF STA and TDF AP reach an agreement on which uplink timeslot and data rate to use.

Downlink Transmission

As stated above, downlink is defined as the transfer of information from an AP to a STA. In the entire TDF communication procedure, the total number of downlink timeslots may change dynamically due to the changing number of associated STAs. When the AP prepares to send frames to the associated STAs, it compares the time left in the remaining downlink timeslots with the duration needed for transmitting the specific downlink frame using the agreed data rate. Then, based on the result, it decides if the frame should be transmitted with the specific data rate during this TDF superframe. Accordingly, fragmentation of downlink frames can be avoided in many instances.

Uplink Transmission

As stated above, uplink is defined as the transfer of information from a STA to an AP. After receiving the registration response frame from the AP, the STA analyzes the frame body to see if it is granted an uplink timeslot. If not, it pauses and applies for the uplink timeslot later. If granted, the STA starts to transmit uplink traffic during the assigned timeslot using the data rate indicated in the registration response frame.

At the beginning of the uplink transmission during the assigned timeslot, the STA sends the first frame in its outgoing queue (buffer) to the AP if there is at least one outgoing frame in the queue (buffer). After that, the STA checks the second uplink frame's length and evaluates if it is possible to send the second/next buffered frame during the remaining duration in the assigned timeslot. If it is not possible to send the next buffered frame, the STA stops the uplink transmission procedure and waits to send the next buffered frame in the assigned timeslot during the next TDF superframe. If it is possible to send the next buffered frame during the remaining duration in the assigned timeslot, then the STA immediately sends the next buffered frame to the destination AP. The sending procedure continues to run in this way until the assigned timeslot has ended, or until there are no more uplink frames to transmit.

STA and AP Equipment

In the network architecture of FIG. 1, example modem stations (STA) 120 and 140 are depicted as having WLAN RF ports to support wireless devices 138 and 158. In one embodiment, the STAs may contain the WLAN RF interface and LAN interface ports as end user/client interfaces. As such, a STA may have both a cable interface supporting communications between an AP and the STA, and an external client interface ports to support wireless user devices or LAN or WAN interfaces to user devices. In one embodiment, a STA having a cable interface and a client external port may also be termed a dual mode device.

Figure 6A:
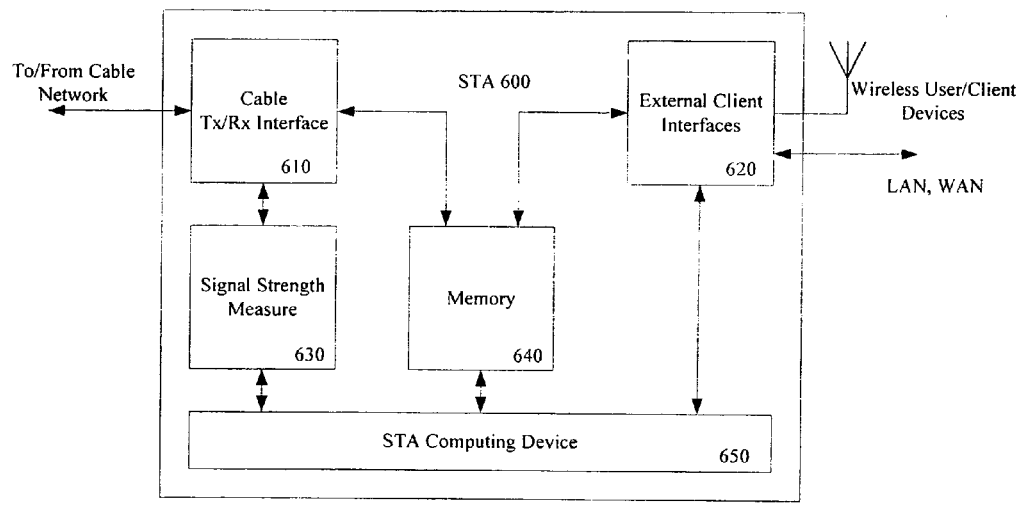
FIG. 6a illustrates an example station (STA)

FIG. 6a depicts one embodiment of a dual mode STA 600. The STA 600 includes a STA computing device 650 or element, such as a processor, gate array, computing logic, microprocessor, or chip set or other control function known in the art, which controls communications transactions on the cable interface 610 and the external client interfaces 620. In this respect, the STA 600 operates in either the cable interface/ADoC system mode or the external interface/client mode. The STA can use mature WiFi chipsets to realize the STA processor/chip set/computing device 650 functions. A memory 640, such as solid state, rotating magnetic, or optical disc, may be used to store program or data information in support of STA computing device activities. In addition, memory 640 may be used by cable interface 610 or client interface 620 for data access. In support of the present invention, a signal strength measurement means 630 is used by the STA to assess the received signal strength of a transmission by the AP.

The STA 600 functions to connect with the cable interface to support bi-directional data communication in a cable network using TDF principles, while the external client interface functions to connect with an antenna or external network connection to support bi-directional data communication for client devices. The STA 600 swaps the data frames between the cable interface 610 and the external client interface 620, if needed, in order to communicate with user/client devices such as PCs, PDAs, routers, switches, printers, smart terminals, and the like in the external networks. Data frames are swapped in order to access an IP network, such as the Internet or an Intranet, via the cable interface to an AP. While in external client interface mode, the dual mode device STA 600 operates as an access point for user devices. The STA 600 transmits RF energy in an ADoC frequency band (about 1 GHz) while in cable interface/ADoC mode. In the external client interface mode, a standard wireless frequency band such as the IEEE 802.11 frequency band (about 2.4 GHz) may be used. In the ADoC system/cable interface mode, the STA uses the above-described TDF protocol, which is based on a time division multiple access (TDMA) method, to transmit media access control (MAC) frames. In the client interface mode, the STA 600 uses any wireless access or wired network protocol, such as the IEEE 802.11 protocol or Ethernet protocol.

Figure 6B:
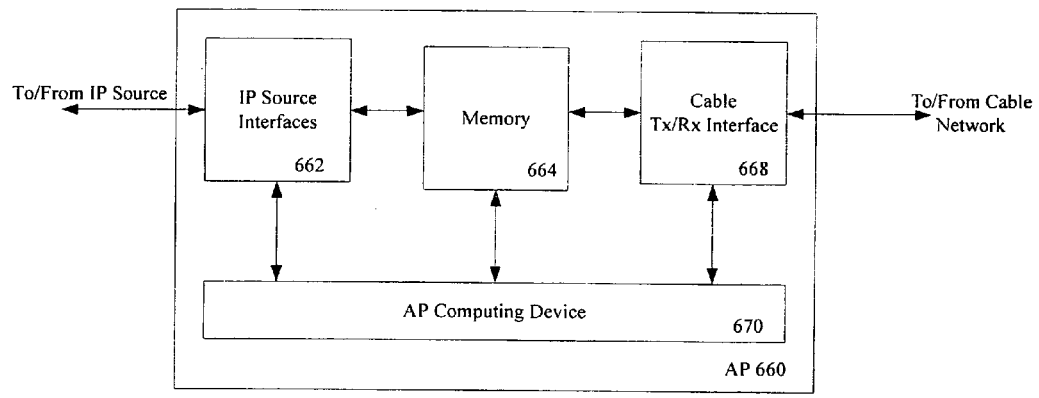
FIG. 6b illustrates an example access point (AP)

FIG. 6b depicts one embodiment of an AP 660. The AP interfaces with an external Internet Protocol source using interfaces 662. Under control of the AP computing device 670, the AP is able to access content from the IP Source as well as the cable interface 668 which provides the time division multiplexed communication function to interact with one or more STAs, such as STA 600. The memory 664 is accessible by the AP computing device 670 and, like memory 640, may be used to store data, programs, and control information to properly coordinate the IP source interfaces 662 and the interaction of the STAs on the cable interfaces 668. Memory 664 may also be used by cable interface 668 or IP source interface 662 for data access. The memory may be any form of memory such as solid state, rotating magnetic, or optical disc. The AP computing device can be any form of computing device which can include a separate or integrated computing device having one or more processors, or computing elements such as programmable logic devices, gate arrays, computing logic, microprocessor, or chip set or other control function known in the art. The AP computing device functions to control the interfaces of the AP 660 as well as to perform or control any determinations or measurements required of the AP such as frame loss computations, signal strength measurement computations, or any other computations related to control of the STAs in unicast, multicast, and broadcast modes.

Multicast Communication Considerations

A multicast transmission is an efficient technique for transferring identical data to multiple users. When the same data are transmitted to multiple receivers, multicasting saves network resources as opposed to unicasting to individual users, so multicast is an important service primitive in networks, especially for video sharing. Yet, the IEEE 802.11 standard does not directly address multicast communications. The standard indirectly supports multicast transmissions by leveraging broadcast without any feedback. But, without feedback, the reliability of the multicast communication is placed in question.

In a wireless environment, a multicast transmission can collide with a unicast transmission when attempting to access the same channel. However, in a time division multiplexed system that uses IEEE 802.11 frames, such as in the TDF system described herein, the timeslot allocation mechanism for transmission generally avoids such collisions.

In IEEE 802.11 wireless networks, two factors can cause packet loss; one is channel error and another is transmission collision. In the ADoC system, the TDF MAC protocol eliminates the packet collision factor. Thus, the main contributor for packet loss is channel error, which is mainly caused by noise and interference. In a cable system, the channel error can be dropped under a required threshold by selecting suitable transmission power, modulation level, and code scheme.

The data rate accommodation provided by IEEE 802.11 is not standardized. Each manufacturer of 802.11 components is free to choose its own data rate adaptation mechanism. Due to the absence of feedback signal such as MAC layer ACK frame or RTS-CTS message frame in multicast, the rate adaptation mechanism used for unicast traffic is not suitable for multicasting. Thus, in general, multicast transmissions keep using the lowest modulation level and coding scheme as in broadcast transmissions. The present invention improves on that scheme.

As an aspect of the present invention, a novel channel quality feedback mechanism and a data rate adaptation technique is constructed for multicast transmissions in a cable environment. With this technique, the data channel can be much better utilized and the performance of multicast transmission significantly improved. Such a channel data rate adaptation technique is also helpful for maintaining adequate quality of multimedia contents transmitted through multicast, and also to achieve the throughput gain for unicast transmission by allocating minimum channel resource on multicast transmission.

In a cable system, such as the TDF ADoC system, downlink traffic from the AP to the STA can be transmitted with the strongest power which the system allows. Although, the uplink transmission from the STA to the AP tends to require careful power control to assure that the signals from different STAs to different APs do not interfere with each other. Therefore for downlink multicast traffic, a power control mechanism is not needed as in the wireless environment, but channel data rate control adaptation is desirable to enhance transmission rate efficiency and to utilize the improved channel conditions that exist in a cable network compared with a wireless network.

The basic steps for the multicast channel adaptation protocol include (a) periodically performing channel sensing to select the STA with the weakest signal strength as the multicast group leader, (b) utilize a feedback mechanism to the AP where the multicast group leader only acknowledges the correct receipt of multicast frames, and (c) adjusting the multicast data transmission rate using a rate reduction mechanism or a rate increasing mechanism as conditions permit.

Multicast Group Leader Selection

As an aspect of the invention, the AP uses signal strength (SS) as a criterion for selecting a multicast group leader. The leader is the STA in a target multicast group that experiences the worst quality received signal from the AP in a multicast transmission. In a wireless environment, the AP can determine the communication quality between itself and any stations by measuring the signal strength of uplink frames from the STA, including data, RTS-CTS, ACK and other frames, because the channel between the AP and the STA is regarded as symmetrical. However, the uplink and downlink channel in a cable system is not guaranteed to be symmetrical. The asymmetrical nature of a cable system results from the asymmetrical character of signal coupler or splitter, such coupler 115 in FIG. 1. To enable the AP to select the correct multicast group leader, the signal strength of multicast frames from AP to a STA must be measured and reported back to the AP by each STA.

As an aspect of the invention, an STA measures signal strength periodically and forwards the signal strength measurement to the AP. Initially, the STAs in a multicast group all respond to a multicast message by sending a measure of their received signal strength. The AP detects the STA having the lowest received signal strength (SS) and assigns this STA to be the multicast group (mgroup) leader. Afterwards, a more efficient reporting and data rate update scheme may be used by employing new information elements in a beacon frame.

Figure 7:
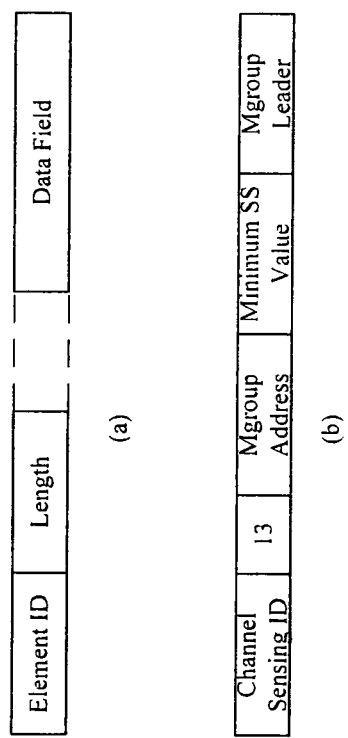
FIG. 7 illustrates an example information element format.

As an aspect of the invention, a new management frame information element termed a channel sensing information element is added. Information elements are variable-length components of management frames. A generic information element has an ID number, a length and a variable-length data field, as shown in FIG. 7(a). For the channel sensing information element of FIG. 7(b), an original reserved element channel sensing ID is used. In the embodiment of FIG. 7(b), the length has a value of thirteen. The variable-length data field contains three fields; a multicast group (mgroup) address field (6 bytes), minimum signal strength (SS) value field (1 byte), and a mgroup leader field (6 bytes). The mgroup address field is an address associated by higher-level, convention with a group of logically related stations. In one embodiment, the mgroup address field is a MAC address concatenation of 01:00:5 E and the last 23 bits of the Class D multicast IP. The minimum SS value field is the signal strength value of the multicast leader, which is ascertained via the past (initial) channel sensing processes.

The channel sensing element format of FIG. 7(b) is available to all STAs in a multicast group through the use of a beacon frame. In the TDF system, a beacon frame is sent as part of a synchronization frame at the beginning of a superframe as in FIG. 5. Thus, in a broadcast beacon frame, all STAs are informed that a specific multicast group has a certain mgroup leader which has a minimum signal strength value.

As an aspect of the invention, the STAs read the channel sensing element in the beacon frame. When the minimum signal strength value is equal to 0xFF, the STAs perform an initial channel sensing. This initial channel sensing occurs when the AP has no previous knowledge of the channel condition of the STAs in a specific multicast group. This value can be presented in a beacon frame for all STAs to read when a multicasting application is initialized and a multicast group is formed. After the initial readings, the AP selects a mgroup leader and a corresponding signal strength value. This new value is then made available to all STAs in the broadcast beacon frame. When the minimum SS value is between 0x00 and 0xFE, the signal strength value is a measured value via the past channel sensing process.

Figure 8:
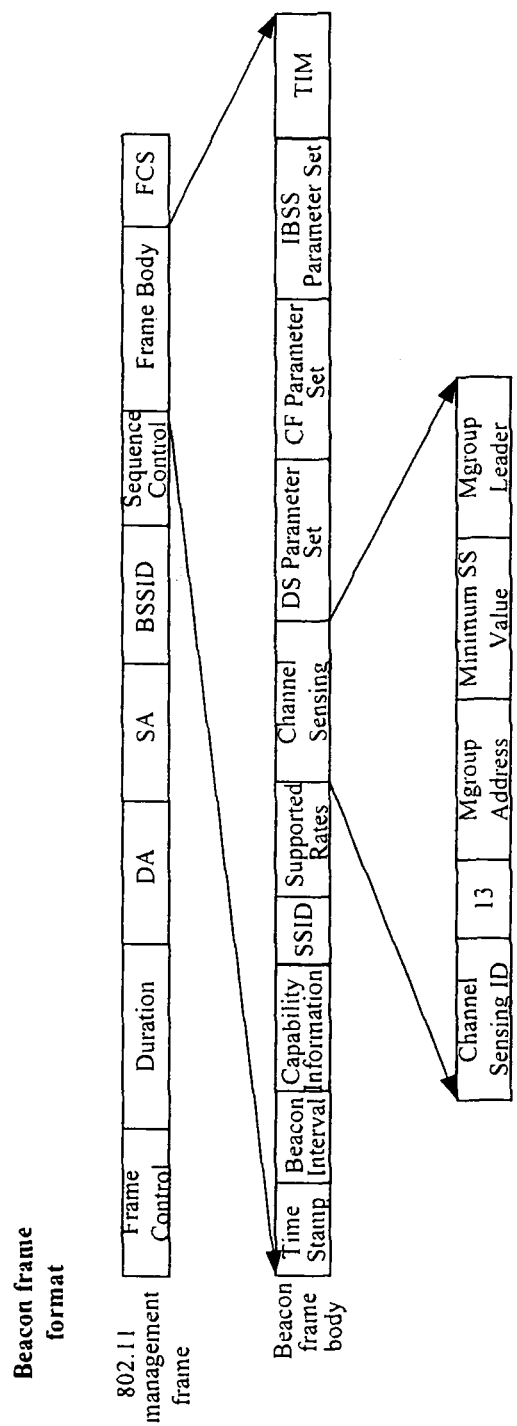
FIG. 8 illustrates an example channel sensing beacon frame.

FIG. 8 depicts a standard 802.11 management frame with a frame body field. As an aspect of the invention, this frame body field is populated as a beacon frame body having a channel sensing field. The channel sensing field is populated with the channel sending element of FIG. 7(b). Thus, all STAs receiving the broadcast beacon frame at the beginning of a superframe can determine the multicast group leader and the minimum signal strength value for a specific multicast group.

During the multicast initialization phase, a multicast data stream is sent by the APs to the multicast STAs. The AP sends an initial channel sensing beacon, in which the minimum signal strength value field is filled with 0xFF. When the channel sensing beacons are received, all STAs in the corresponding multicast group measure the received signal strength value of the beacon. And then, the STAs send feedback frames to the AP to report the received signal strength. The payload of the feedback frames is the measured signal strength value. After receiving the feedback frames, the AP records the minimum signal strength value and selects the STA with the minimum signal strength value as the multicast group leader. The AP loads the identity of the mgroup leader as a reference, the received signal strength of the reference mgroup leader, and mgroup address into the beacon frame of FIG. 8.

After the initial channel sensing, the AP periodically sends the channel sensing beacons, filled with the minimum signal strength value detected, to ask the STA to do a periodic channel measurement. The period of the channel sending beacons is selected to enhance adaptation to changing station conditions. The period is also selected to avoid excessive data rate changes or churning. On operation, if a STA receives a channel sensing beacon whose minimum signal strength value is not equal to 0xFF, then the STA first determines whether it belongs to the particular multicast group by reading the mgroup address field. After that, the STA compares its current measured signal strength value with the minimum signal strength value in the beacon. If the current measured SS value is lesser than the minimum SS value, the STA regards itself as a worse case station for receive signal strength and provides the measured SS value to the AP.

Figure 9:
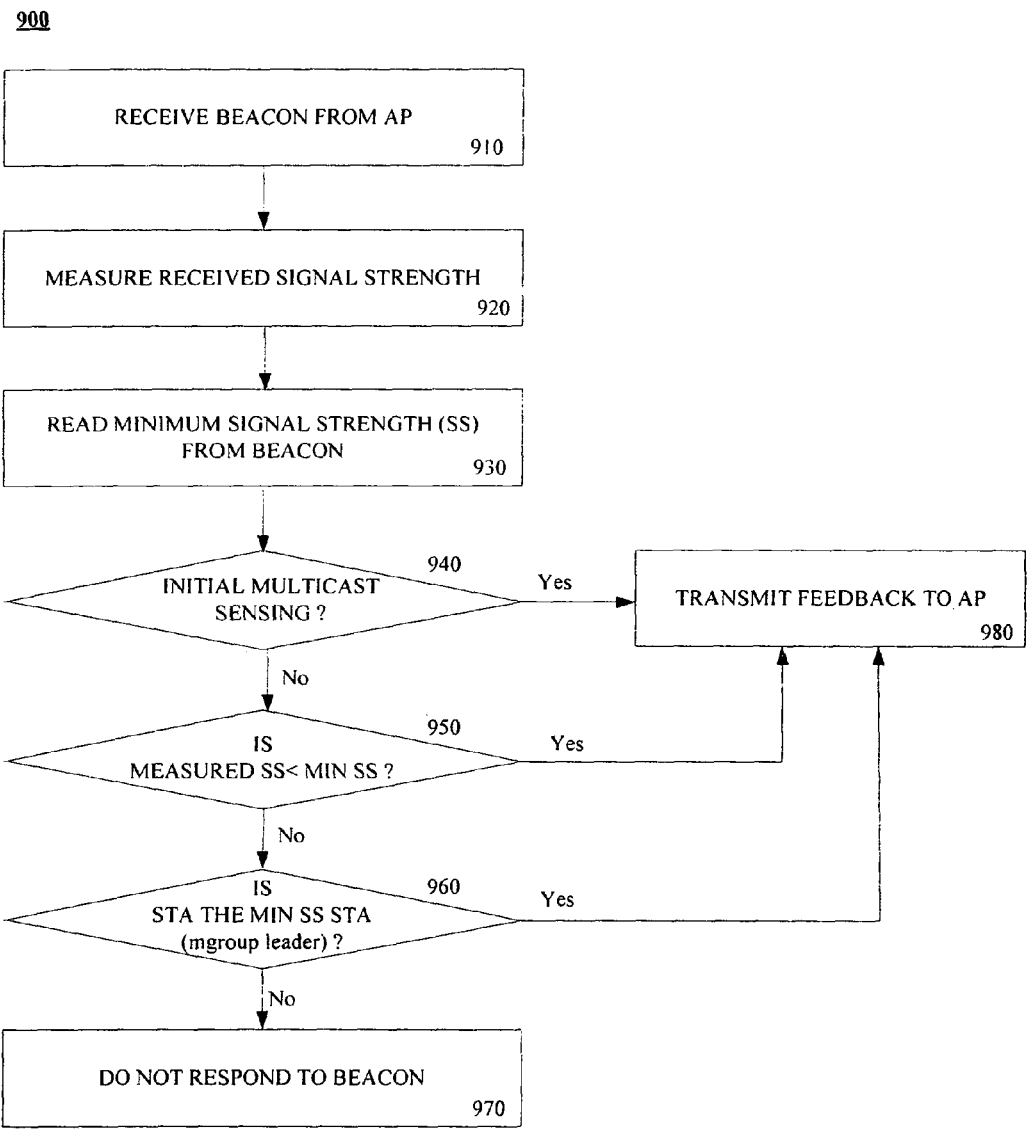
FIG. 9 illustrates an example method for a station (STA)

If the STA belongs to the special multicast group and finds its own signal strength (SS) is better than the minimum SS value, the STA determines whether its own MAC address is the same as that of the mgroup leader. If the two addresses are the same, the STA provides feedback to the AP including the new SS value with its MAC address. The AP modifies the value of the minimum SS value field and decides whether to select a new mgroup leader according to the received feedback from the STAs. FIG. 9 represents an example of this process.

Example STA Operation

FIG. 9 depicts an example method 900 of the channel sensing process as performed in the STA. At step 910, a beacon frame is received by the STA. The signal strength of the received broadcast beacon frame is measured at step 920. At step 930, the minimum signal strength value field is read from the beacon frame. At step 940, a determination is made if this is an initial channel sensing for this multicast group. This determination is made by comparing the minimum signal strength value field of the channel sensing element of the beacon frame to values as described above. If it is an initial multicast channel sensing, then the method 900 moves from step 940 to 980, and the measured signal strength value is sent as feedback to the AP. In this instance, an initial signal strength value measurement is sent to the AP so that the AP can make a determination of the lowest SS value and a corresponding initial mgroup leader.

If this is not the initial channel sensing for this multicast group, then step 950 is entered from step 940. At step 950, a determination is made if the measured value of signal strength is less than the minimum signal strength previously recorded for the mgroup leader. If the measured value is less than the minimum SS value of the mgroup leader, then the method 900 moves to step 980 where the measured STA receive signal strength is sent back to the AP as feedback. The feedback to the AP includes not only the measured SS-value, but also the identity of the responding STA. In this instance, at step 950, the responding STA has a measured received signal strength that is less than the mgroup leader that the AP has previous selected. As a result, the AP may determine that the responding STA should be the new mgroup leader and that the new SS measurement should be the new minimum SS value for the beacon frame.

If the determination at step 950 is negative, then the measured signal strength of the transmission to the STA is above the minimum SS level. If the measured signal strength is equal to the minimum SS level, then the mgroup leader or other stations do not provide feedback to the AP (Not shown in FIG. 9). At step 960, a determination is made as to whether the STA is the mgroup leader. If the STA is the mgroup leader then the method moves to step 980 and the newly measured receive signal strength measurement is reported back to the AP along with the STA MAC address. In this instance, the new, higher value of measured signal strength is fed back to the AP so that the AP can update the minimum SS value for this mgroup leader. At step 960, in the instance where the STA is not the mgroup leader, then the method moves to step 970 and no response to the beacon from the STA is provided. In this instance, the measured SS is greater than the minimum SS value as measured by a STA that is not the mgroup leader (i.e. not the weakest receive signal strength STA). Thus, no feedback to the AP is needed.

Feedback Mechanism for Multicast Traffic

The AP multicasts data frames to the STA members in the corresponding multicast group. If the STA is the multicast group (mgroup) leader and receives the multicast frame without error, then only the mgroup leader STA sends back an ACK signal/message. The AP then knows that the group leader received the multicast message. The AP then also assumes that all other STAs in the mgroup received the multicast message without error if no negative acknowledgement (NACK) signals/messages are received from the other STAs in the mgroup. If the mgroup leader STA receives the multicast frames with error, the mgroup leader STA does nothing. The AP expects the mgroup leader STA to respond to a multicast message only if the message is properly received. If the mgroup leader STA does not respond, the AP knows the mgroup leader STA did not receive the message properly.

If the STA is not the mgroup leader, and receives the multicast frames without error, the STA does nothing. If the multicast message is received in error by the non-mgroup leader STA, then the non-group leader STA sends back a NACK signal/message.

In summary, after a multicast frame is sent, there are many kinds of possible feedback. First, if all STAs in the multicast group receive the multicast frame without error, the feedback to the AP is only the ACK signal/message from the multicast group leader. Second, if the mgroup leader receives the frame without error but at least one of the other STAs receives the frame with error, then a collision occurs between the ACK signal/message from mgroup leader and the NACK signal/message from the other STAs with the receive error. Third, if the mgroup leader and one or several of the other STAs receive the multicast message with error, the feedback is a NACK signal/message or a collision of several NACK signals/messages from the STAs that received the multicast message in error. Finally, if there is no feedback to the AP after the transmission by the AP of a multicast message, then the AP concludes that the multicast message/frame is lost. In general, except for a clear ACK feedback signal from the STA mgroup leader, the AP regards all other feedbacks as NACK collisions. As a result of a NACK collision, the AP can resend the multicast message until it is properly received or reduce the data rate and resend the multicast message until it is received properly.

Multicast Rate Selection Based on Feedback

The AP initially selects a certain multicast data rate for sending multicast traffic. When successive ACK feedbacks are received by the AP, the multicast transmission rate rises to the next higher level. In one embodiment, $\hat{N}$ is a counter which is adaptively adjusted in the data rate adaptation process. When the multicast rate is increased, the AP begins a temporary higher rate period (THRP), during which the AP can make a decision about whether it can use the higher multicast data rate. The decision is determined on whether there occurs one frame loss in a particular window $W_{drop}$. The window $W_{drop}$ is presented as the number of multicast frames transmitted after increasing the data rate for multicast messages/transmissions/traffic/data. The window value is determined from frame loss ratio threshold $P_{flr\_th}$. The loss ratio threshold $P_{flr\_th}$ is a probability threshold. When the frame loss rate of multicast traffic with a higher rate is larger than $P_{flr\_th}$ the message transfer success with the higher rate is worse than the message transfer success rate with the original lower rate. So, the new higher rate should not be used and the AP should drop its multicast rate back to the original one. $P_{flr\_th}$ is determined as:

$$P_{flr\_th} = 1 - \frac{\text{virtual\_transmission\_time}(R_{high})}{\text{virtual\_transmission\_time}(R_{low})}.$$

Where Virtual_transmission_time means the total transmission time needed for transmitting a multicast frame, which includes all PHY and MAC overheads, such as PHY preamble, SIFS, DIFS, ACK or NACK and payload (MSDU), and where $R_{high}$ is the new higher data rate and $R_{low}$ is the earlier lower data rate. With $P_{flr\_th}$, $W_{drop}$ can be determined as ($\lceil x \rceil$ represents the integer not less than x):

$$W_{drop} = \left\lceil \frac{1}{P_{flr\_th}} \right\rceil$$

Therefore in the THRP, which is determined by $W_{drop}$, any loss multicast frame (such as a negative acknowledgement "NACK" signal/message event) causes the AP to drop its multicast rate back to the original lower one. The above determinations for the AP may be made by the AP computing device of FIG. 6b or other logic. Frame loss may be indicted on a frame basis, a block basis, or both.

$\hat{N}$ is adaptively adjusted in the multicast rate adaptation process. When a new multicast application is initialized or when the AP begins to use a new data rate for multicast traffic, $\hat{N}$ is set or reset. In one embodiment, the reset value is ten. Each time the AP tries to increase its multicast rate, but the rate drops back to its original lower rate again while in the THRP time frame. $\hat{N}$ is increased via binary backoff method:

$$\hat{N} = \hat{N} * 2^T$$

Where T is the number of data rate dropback events experienced by the AP. The increasing signal strength of the multicast group detected triggers the AP to reset $\hat{N}$ back to ten.

If AP does not drop its multicast rate back to its original lower rate during the THRP time frame, the AP uses the higher rate for following multicast data transmission. During the transmission (out of the THRP time period), when two frames get NACK events among $W_{drop}$ consecutive multicast frames, the multicast transmission rate drops to the next lower level.

Example AP Operations

Figure 10:
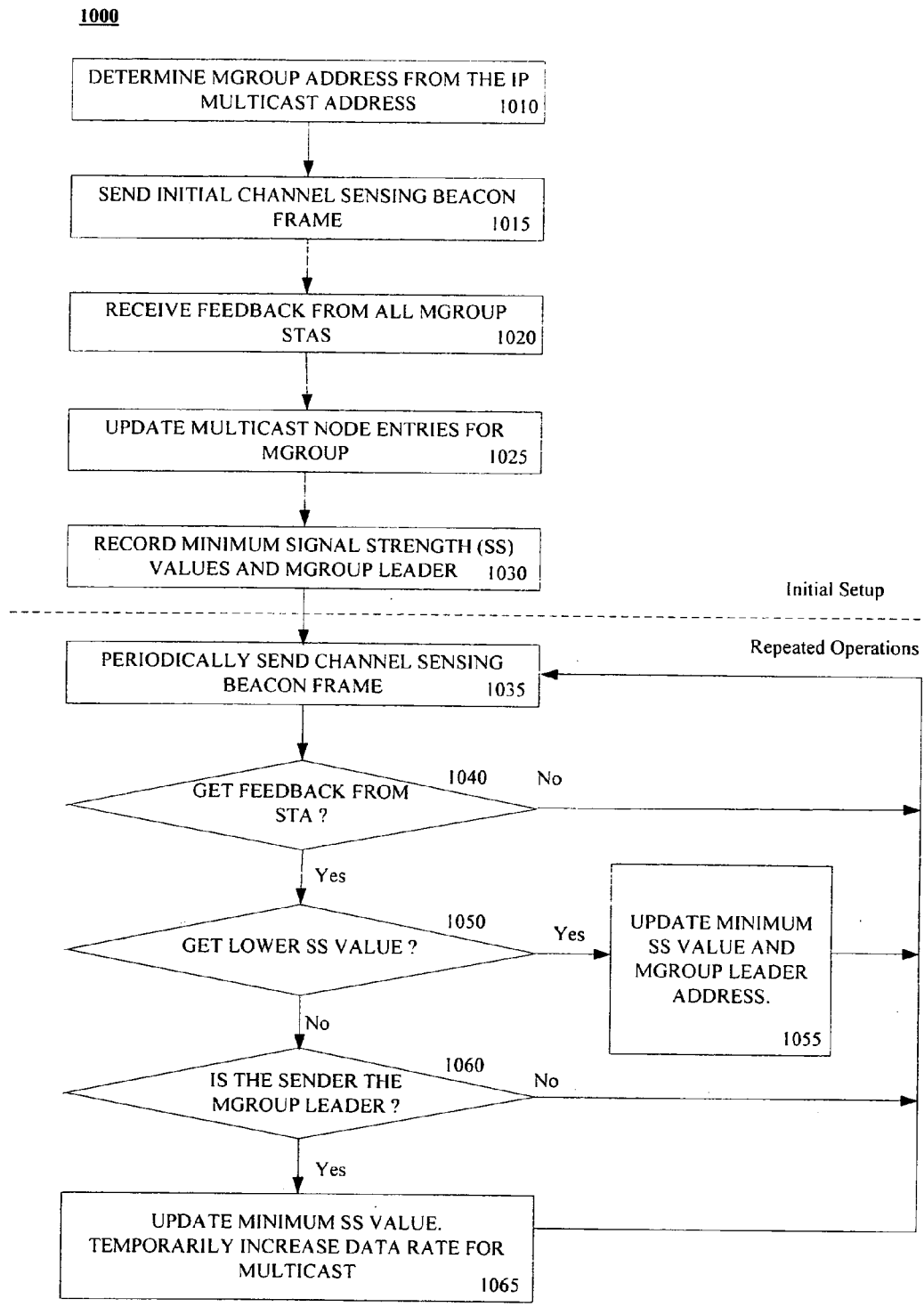
FIG. 10 illustrates an example method for an access point (AP)
Figure 11:
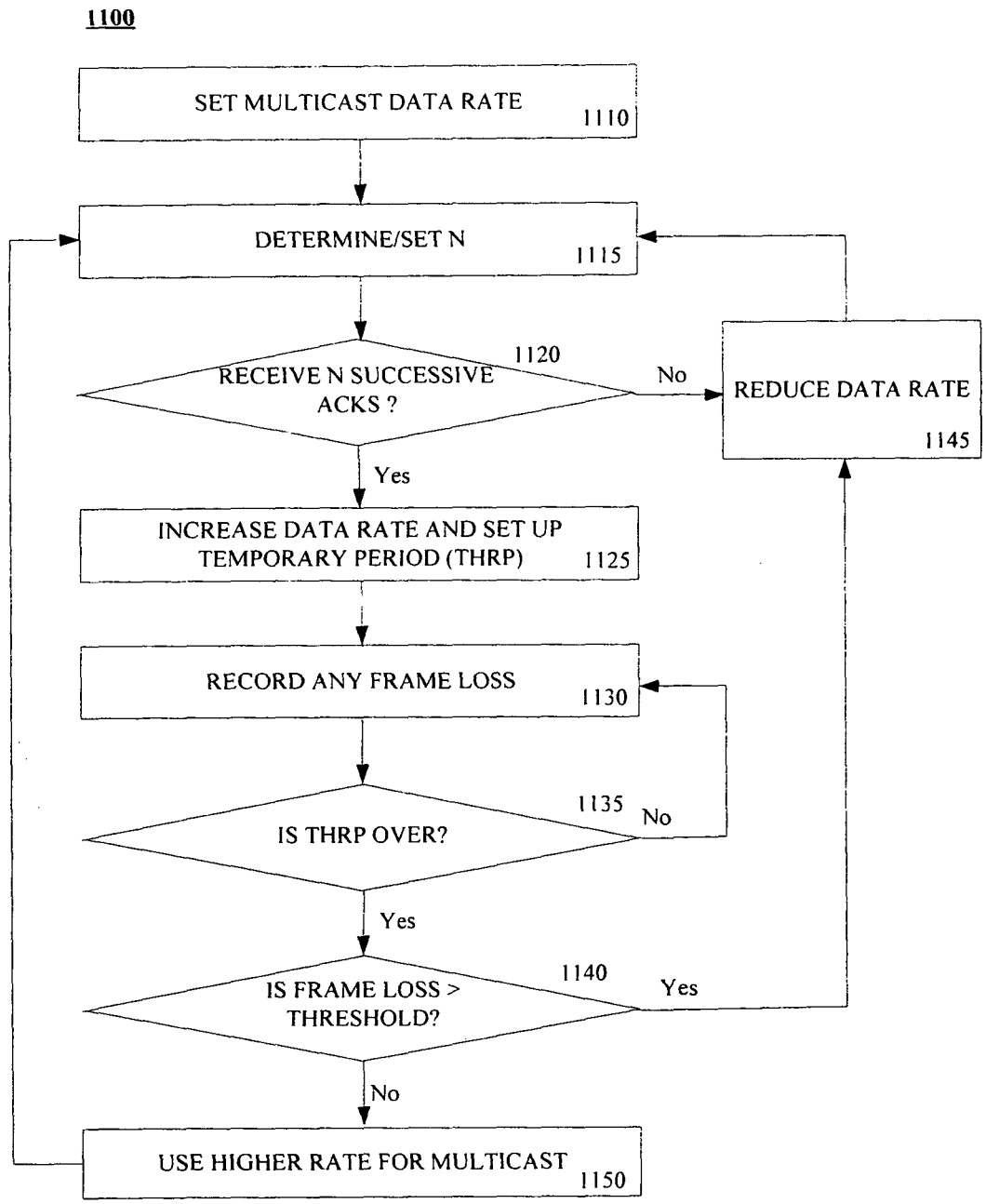
FIG. 11 illustrates and example method of adaptive data rate adjustment.

The channel sensing operations in the AP are depicted in the example method of FIG. 10. FIG. 11 depicts an example method for AP rate adjustments. Considering FIG. 10, an example method of performing channel sensing operations start at step 1010 where the mgroup address is determined from the IP multicast address. The modified beacon frame is then sent to all STAs at step 1015. Since this is an initial setup, and the minimum SS value field is 0xFF, then all stations respond at step 1020 by providing feedback, in their appointed TDM timeslots, of their measured signal strength. At step 1025, the AP updates all of the node entries for stations in the multicast group of interest. The AP then determines the multicast group leader as being the STA in the mgroup that has the lowest signal strength indication. The data rate accommodated by this mgroup leader STA is the data rate that the AP is initially used for multicast messages to the mgroup. Steps 1010 through 1030 are included in the initial period for setup of channel sensing according aspects of the invention. Repeated and periodic AP operations commence at step 1035.

At step 1035, a beacon frame having the mgroup leader and its corresponding signal strength for the mgroup is sent to all STAs. A multicast message is then sent to the multicast group (mgroup). At step 1040, as a result of the multicast message, the AP determines if it received feedback is from a STA in the mgroup. If no feedback is received, then the method 1000 returns to step 1035. Here the beacon message may be periodically repeated until feedback, such as a new received signal strength measurement from a STA, is received. If feedback is received, such as a new received signal strength indication, then a determination is made at step 1050 as to whether the received signal strength (SS) value is less than the recorded SS value for the mgroup leader. If the value is lower, then the minimum SS value is recorded at step 1055. If the mgroup leader is changed, then the new mgroup leader is recorded at step 1055. The method 1000 then returns to step 1035.

At step 1050, if the newly measured SS value from an STA is greater than or equal to the mgroup leader minimum SS value, then step 1060 is entered. At step 1060, the AP determines if the feedback came from the mgroup leader. If the feedback is not from the mgroup leader, then step 1060 moves to step 1035. If the feedback is from the mgroup leader, then the method 1000 moves from step 1060 to step 1065, where the increased and updated value of the received signal strength for the mgroup leader is recorded and updated in the beacon frame. At step 1065, since the a new minimum signal strength value is entered that is greater than the previous minimum signal strength value, the multicast data rate can be temporarily increased and the method of FIG. 11 can be executed in parallel with method 1000 to test for frame loss at the increased data rate. If the new data rate is adopted, then the new higher data rate is associated with the new minimum signal strength value for the mgroup leader. Step 1065 then returns to step 1035 and the beacon frame data is updated and periodically transmitted.

FIG. 11 depicts an example method 1100 for dynamic rate adjustment of multicast messages occurring in the AP. The method begins at step 1110 where an initial multicast rate is selected for sending multicast information frames. Generally, the initial data rate is the data rate that associates with the lowest (minimum) receive signal strength value of the mgroup leader provided by the AP in the beacon frame. At step 1115, the counter parameter $\hat{N}$ is determined and set as a reference. In one embodiment, the initial value for $\hat{N}$ is ten. At step 1120, a determination is made if the AP has received $\hat{N}$ successive ACK signals/messages from STAs in the course of normal TDM operations. Here, normal TDM operations may include any multicast messages to the multicast group being considered. Successful, successive ACK signals/messages are acquired as a result of successful multicast transmissions by the AP to the multicast group of STAs. If $\hat{N}$ successive ACK signals/messages are not received, the method 1100 is unsuccessful at the current data rate and the method moves to step 1145 to lower the data rate. When $\hat{N}$ successful ACK signals/messages are reached, the method moves to step 1125 where the transmission data rate is increased for a temporary length of time. The temporary length of time is termed the temporary high rate period (THRP). At step 1130, frame loss is recorded for the $W_{drop}$ period according to the algorithms described above. At step 1135, a determination is made as to whether the temporary high rate period (THRP) has expired. If the THRP has not expired, then the process 1100 loops through step 1130. If the THRP has expired, the method moves to step 1140.

A determination is made at step 1140 as to whether the frame loss threshold is greater than the threshold $P_{flr\_th}$. If the frame loss rate is greater than the threshold, then the new higher rate is not working well and the method moves to step 1145, where the rate is reduced to its previous lower value. The process can then restart at step 1115 where a new value of $\hat{N}$ is determined and set. If the frame loss threshold dos not exceed a threshold, then the new higher rate is working well and the method 1100 moves to step 1150 where the temporary higher data rate is adopted as the multicast data rate to be used by the AP for the specific mgroup. The process can then restart at step 1115. Thus, FIG. 11 represents a technique to dynamically adjust the transmit data rate of an AP for multicast messages. The above method is adaptable to changes in the stations as well as the access points. The method relies on frame loss to determine if a newly selected higher data rate is acceptable for a multicast group.

Features and aspects of described implementations may be applied to various applications. Applications include, for example, individuals using host devices in their homes to communicate with the Internet using an Ethernet-over-cable communication framework, as described above. However, the features and aspects herein described may be adapted for other application areas and, accordingly, other applications are possible and envisioned. For example, users may be located outside of their homes, such as, for example, in public spaces or at their jobs. Additionally, protocols and communication media other than Ethernet and IEEE 802.11 may be used. For example, data may be sent and received over (and using protocols associated with) fiber optic cables, universal serial bus (USB) cables, small computer system interface (SCSI) cables, telephone lines, digital subscriber line/loop (DSL) lines, satellite connections, line-of-sight connections, and cellular connections.

The implementations described herein may be implemented in, for example, a method or process, an apparatus, or a software program. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus such as, for example, a processor, which refers to processing or computing devices in general, including, for example, a computer, a microprocessor, an integrated circuit, or a programmable logic device. Processing devices also include communication devices, such as, for example, computers, cell phones, portable/personal digital assistants ("PDAs"), and other devices that facilitate communication of information between end-users.

Implementations of the various processes and features described herein may be embodied in a variety of different equipment or applications, particularly, for example, equipment or applications associated with data transmission and reception. Examples of equipment include video coders, video decoders, video codecs, web servers, set-top boxes, laptops, personal computers, and other communication devices. As should be clear, the equipment may be mobile and even installed in a mobile vehicle.

Additionally, the methods may be implemented by instructions being performed by a processor or other form of computing device, and such instructions may be stored on a computer-readable medium such as, for example, an integrated circuit, a software carrier or other storage device such as, for example, a hard disk, a compact diskette, a random access memory ("RAM"), a read-only memory ("ROM") or any other magnetic, optical, or solid state media. The instructions may form an application program tangibly embodied on a computer-readable medium such as any of the media listed above. As should be clear, a processor or other form of computing device, may include, as part of the processor unit, a processor-readable medium having, for example, instructions for carrying out a process.

Regarding buffers and storage devices, note that a variety of devices throughout the described implementations typically include one or more storage devices or buffers. Storage may be, for example, electronic, magnetic, or optical.

As is evident from the foregoing disclosure, implementations may also produce a signal formatted to carry information that may be, for example, stored or transmitted. The information may include, for example, instructions for performing a method, or data produced by one of the described implementations. Such a signal may be formatted, for example, as an electromagnetic wave (for example, using a radio frequency portion of spectrum) or as a baseband signal. The formatting may include, for example, encoding a data stream, packetizing the encoded stream according to any of a variety of frame structures, and modulating a carrier with the packetized stream. The information that the signal carries may be, for example, analog or digital information. The signal may be transmitted over a variety of different wired or wireless links, as is known.

The invention claimed is:

1. A method comprising:
   transmitting multicast data frames at a first data rate;
   receiving a number of acknowledgments of successful frame reception using the first data rate;
   increasing the first data rate to a second data rate for a period of time in response to the number of acknowledgements;
   transmitting multicast data frames at the second data rate;
   determining frame loss during the period of time; and
   determining a third multicast data rate responsive to the multicast frame loss, wherein the step of determining a third multicast data rate responsive to the multicast frame loss comprises using the second data rate as a new multicast data rate if the frame loss is less than a threshold, and wherein the threshold is a probability threshold based upon a ratio of transmission times of the second data rate and the first data rate.

2. The method of claim 1, wherein transmitting multicast data frames comprises transmitting multicast data frames in a cable communication system.

3. The method of claim 1, wherein the first data rate is selected by an access point.

4. The method of claim 1, wherein the step of increasing the first data rate to a second data rate further comprises increasing the first data rate to the second data rate responsive to feedback from a multicast group.

5. The method of claim 4, wherein feedback from the multicast group comprises an increased receive signal strength indication of a reference station.

6. The method of claim 5, wherein the increased receive signal strength indication is transmitted to all stations in the multicast group using a beacon frame.

7. The method of claim 5, wherein the reference station is characterized as having a lowest receive signal strength value within the multicast group.

8. The method of claim 4, wherein feedback from the multicast group comprises receiving multiple consecutive acknowledge messages, each acknowledge message received after transmitting multicast data frames to the multicast group.

9. The method of claim 8, wherein the number of consecutive acknowledge messages exceeds a threshold value.

10. The method of claim 9, wherein the threshold value is adaptively adjusted.

11. The method of claim 8, wherein only a reference station in the multicast group sends an acknowledge message upon successful receipt of a multicast data frame.

12. The method of claim 11, wherein stations other than the reference station in the multicast group transmit a negative acknowledge message upon receiving a multicast data frame in error.

13. The method of claim 1, wherein the step of determining a third multicast data rate responsive to the multicast frame loss comprises reducing the second data rate back to the first data rate if the frame loss reaches a threshold.

* * * * *